Oct. 20, 1925.  
C. I. PRESTON  
1,557,875  
PARALLEL CRANK MOTION FOR RADIAL ENGINES  
Filed Dec. 14, 1922    3 Sheets-Sheet 2

Inventor
Charles I. Preston
By Robert A. Young Atty

Oct. 20, 1925.

C. I. PRESTON 1,557,875

PARALLEL CRANK MOTION FOR RADIAL ENGINES

Filed Dec. 14, 1922  3 Sheets-Sheet 3

Inventor
Charles I. Preston

By Robert H. Young  Attorney

Patented Oct. 20, 1925.

1,557,875

UNITED STATES PATENT OFFICE.

CHARLES I. PRESTON, OF DAVENPORT, IOWA.

PARALLEL-CRANK MOTION FOR RADIAL ENGINES.

Application filed December 14, 1922. Serial No. 606,979.

*To all whom it may concern:*

Be it known that I, CHARLES I. PRESTON, a citizen of the United States, residing at Davenport, in the county of Scott and State of Iowa, have invented certain new and useful Improvements in Parallel-Crank Motions for Radial Engines, of which the following is a specification.

This invention relates to a parallel crank motion for radial engines, the object in view being to produce a parallel crank radial engine, preferably of the air-cooled type, having certain distinctive and novel features designed to give greater compactness, smoother running qualities at high speeds and greater reliability in use.

The parallel crank motion herein described and shown, is designed to produce a more perfect balance than has hitherto been attained by radial engines, having a rotary shaft and non-rotary or stationary cylinders arranged in radial relation thereto, thus rendering possible higher speed and consequently more power for a given size of cylinder.

Under the contemplated construction, the connecting rods are all attached by knuckle pins to a knuckle pin yoke which may be of annular formation or of any other preferred design, such as a disk or ring, said yoke being mounted on the crank pins of several cranks whose throws are always equal and parallel. As the cranks revolve the yoke moves bodily in an annular path, every point of the yoke moving in a circle the radius of which is equal to the radius or throw of the cranks. Each of the knuckle pins describes a complete circle of the crank radius and hence all of the pistons move alike, the result being a uniform motion which may be more closely counterbalanced than the master rod type of engine, at the same time securing a more even bearing pressure which is effectively distributed.

The propeller shaft is driven off one or more of the three cranks, above mentioned, either directly or through gears. In the smaller sizes, propeller gearing is used so that the engine may run at higher speed and thus develop its power with small cylinders, light weight, small over-all diameter and minimum head resistance.

A further object in view is to provide a construction of radial engine which will enable one or more cannons or machine guns to be inserted therethrough thus eliminating the necessity of using synchronizing gears in order to fire between the blades of the propeller.

With the above and other objects in view, the invention consists in the novel construction, combination and arrangement herein fully described, illustrated and claimed.

In the accompanying drawings—

Figure 2 is a section taken at a right angle to Figure 1 on the line 2—2 of Figure 1;

Figure 5 is a fragmentary section illustrating a direct drive rather than a geared drive as illustrated in Figure 2.

Figure 1:
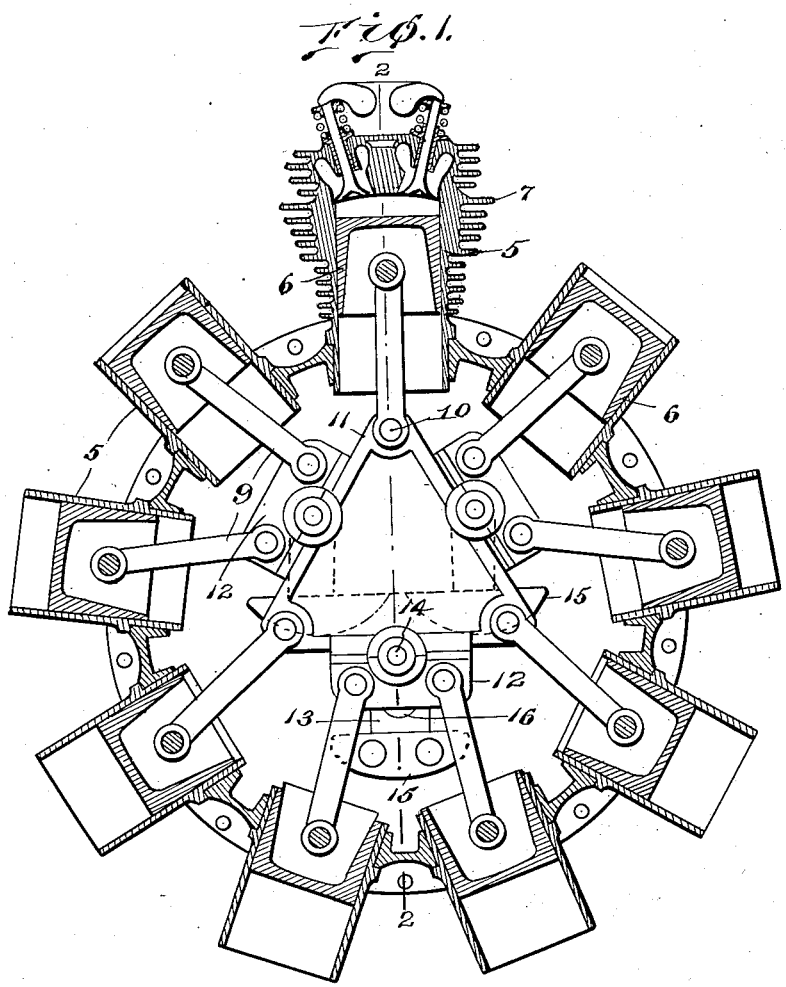
Figure 1 is a view partly in elevation and partly in section through the improved radial engine taken at a right angle to the centrally located propeller shaft.

Referring to the drawings, the engine illustrated therein is shown as composed of a circular series of non-rotary or stationary cylinders 5, each containing a reciprocatory piston 6. The cylinders 5 are of the air-cooled type being shown as provided with cooling fins 7 which extend around the combustion chambers and also encircling the cylinder heads.

Figure 3:
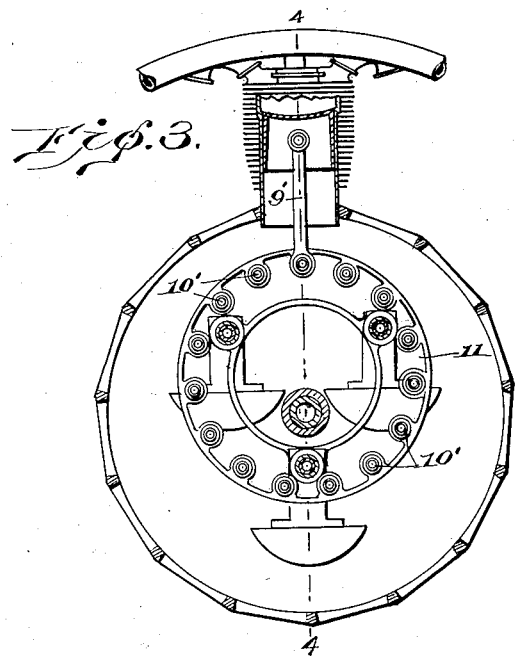
Figure 3 is a partial section on the same line as Figure 1 showing another form of knuckle pin yoke.

The cylinders 5, are arranged around a centrally located propeller shaft or hub 8. The connecting rods 9 of all of the pistons 6 are attached by annular pins 10 at their inner ends to a common knuckle pin yoke 11. The yoke 11 may be of any preferred design or formation, such as a triangle, as illustrated in Figure 1, a disk or an annular ring as shown in Figure 3. Under the arrangement shown in Figures 1 and 2, the knuckle pins 10 of certain connecting rods are connected to the angles of the triangular yoke while the remaining connecting rods are connected by knuckle pins to bearing members 12 secured by suitable means, as shown, to the main body of the yoke. In such case the yoke is composed of the triangular member 11 and the bearing members 12. All of the knuckle pins 10 are arranged in a circle equidistant from the center of the engine so that all of the crank throws are alike and each piston has an equal movement.

In a nine cylinder engine, such as is illustrated in Figure 1, I employ three crank-like members 13 each of which is connected by a pivot 14 to the yoke 11 at one end, said crank-like member 13 carrying a counterbalance weight 15 at the other end. Midway between its ends each crank-like member is mounted to turn on a journal or stud shaft 16, journaled in bearings in webs or frame members 17 and 18 contained within the crank case or housing 19 of the engine, which crank case has the cylinders 5 fastened thereto in any suitable way.

Figures 2, 5:
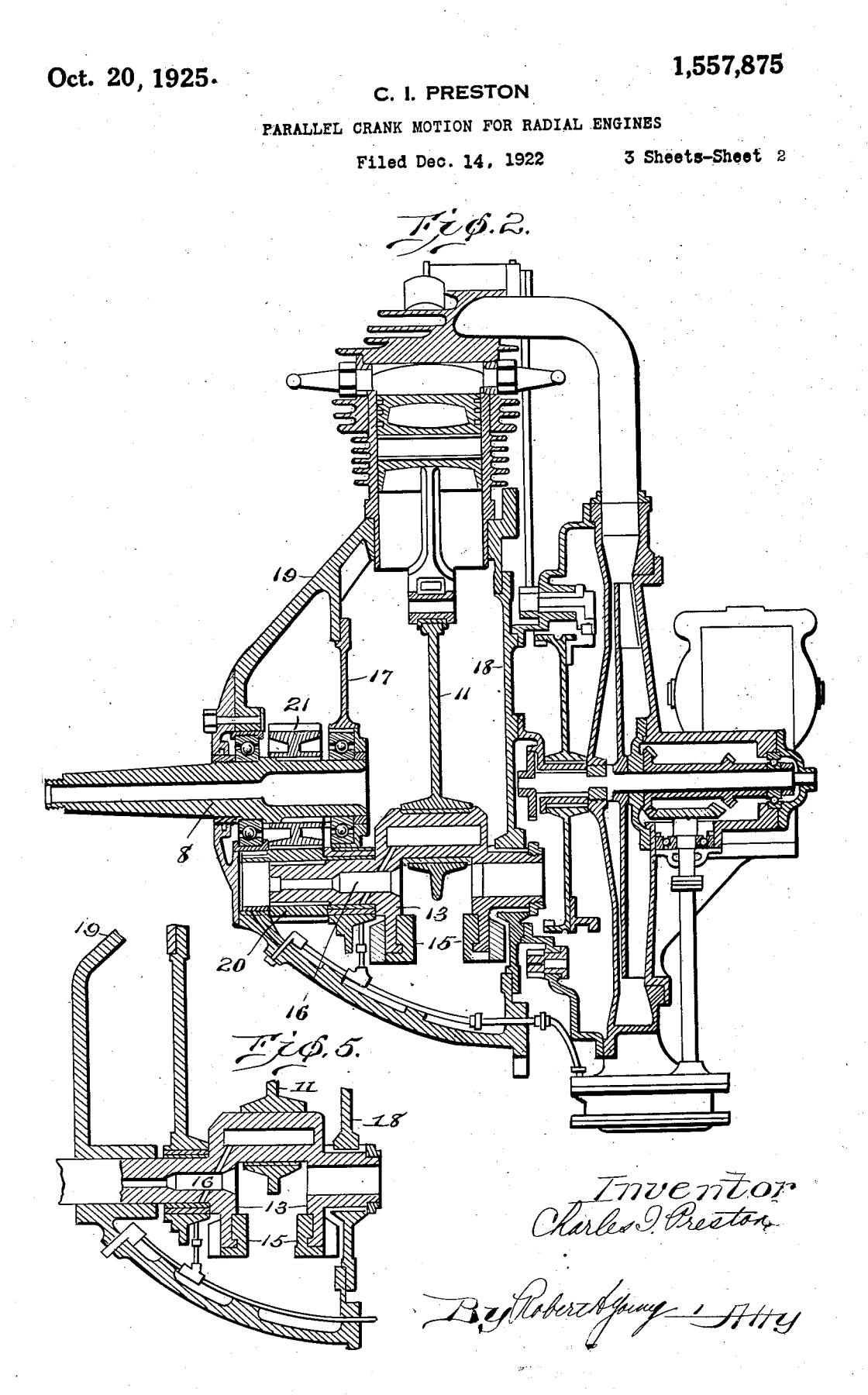
Figure 4:
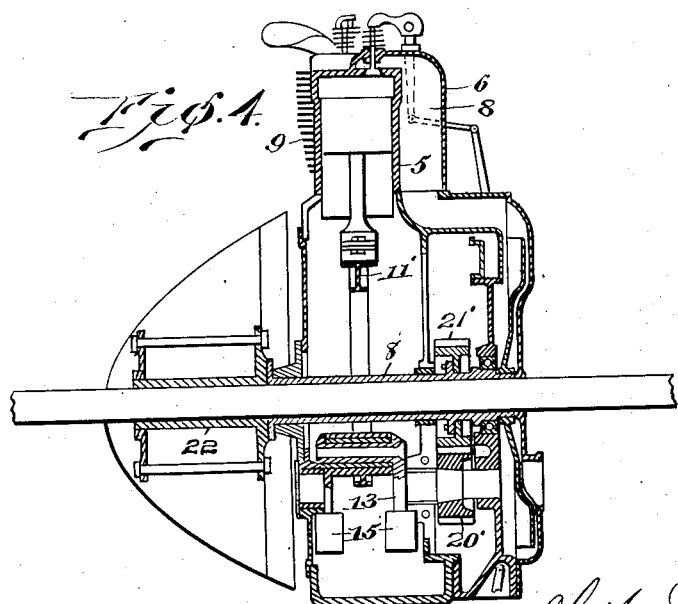
Figure 4 is a section taken on the same line as Figure 2, and on the line 4—4 of Figure 3 showing a tubular engine shaft passing through the yoke.

As shown in Figure 2, the journal or shaft of one of the crank-like members 13 has fastened thereon a gear wheel 20 which meshes with and drives a similar gear wheel 21 fast on the propeller shaft 8, which may be the engine shaft, as illustrated in Figure 4, and thus the power transmitted by the yoke 11 to the crank-like members 13 is transmitted to the propeller shaft or the engine shaft, as the case may be, it being understood that the yoke is driven in an annular path by the connecting rods 9. It will, therefore, be understood that, in the same manner, all of the crank-like members 13 may be geared to the shaft 8 and that a greater or less number of crank-like members 13 may be employed in accordance with the general design and size of the engine and the number of cylinders incorporated therein. The shaft 8 is journaled in bearings supported by an end wall of the crank case 19 and one of the internal fixed webs or bearing members 17 and 18. The valve operating mechanism shown to the right of the web 18 in Figure 2 need not be herein described as it is incorporated in a separate copending application.

In Figure 4, the yoke designated 11' is shown of annular or ring-like formation and bears the knuckle pins 10' to which the connecting rods 9' are attached, all of the knuckle pins 10' being arranged in a true circle so that each will travel in a circular path, the result being exactly the same as that described in connection with the yoke shown in Figure 1. Figure 4, which is a section taken at a right angle to Figure 3, shows the engine shaft 8' of tubular formation or with an axial bore extending entirely therethrough from end to end adapting the same to have one or more barrels of cannon or machine guns inserted therethrough. By this means the gun or guns may be fired without employing the usual complicated synchronizing gear used where the gun fire is between the blades of the propeller while in motion.

Figure 4 shows one of the crank-like members 13' connected by gears 20' and 21' to the shaft 8' upon which the propeller hub 22 is directly mounted. Figure 2 illustrates the use of two counterbalanced weights 15 on each crank-like member 13 and Figure 4 illustrates the use of two counterbalanced members 15' on each crank-like member 13'. In the device as illustrated in Figure 5 the shaft 16 extends outside of the casing 19 to drive the propeller.

From the foregoing description, taken in connection with the accompanying drawings, it will be obvious that the number of crank-like members 11 may be changed to suit the particular engine on which the improved transmission mechanism is used, and also the number of driving gear wheels or pinions used to transmit motion from the crank-like members to the propeller shaft or the engine shaft. It is not necessary that the propeller shaft pass through the knuckle pin yoke, as illustrated, for example, in Figures 1 and 2, and it is not essential in carrying out the present invention to have a clear opening through the center of the engine and through the knuckle pin yoke. The knuckle pin yoke might be mounted on an eccentric on a propeller shaft with one or more auxiliary crank-like members to maintain it in annular or circular motion. These and many other changes in the form, proportion and minor details of construction may be resorted to without departing from the principle of the invention.

What I claim is—

1. In a radial engine, the combination of a rotary shaft, a circular series of cylinders, cooperating pistons, and transmission means between the pistons and the engine shaft, comprising connecting rods, a knuckle pin yoke to which the connecting rods are attached, and crank-like members which direct said yoke in an annular path, one or more of said crank-like members having driving connection with the engine shaft.

2. In a radial engine, the combination of a rotary shaft, a circular series of cylinders, cooperative pistons, and transmission means between the pistons and the engine shaft, comprising connecting rods, a knuckle pin yoke to which the connecting rods are attached, and crank-like members which direct said yoke in an annular path, said yoke surrounding the engine shaft, one or more of said crank-like members having driving connection with the engine shaft.

3. In a radial engine, the combination of a rotary shaft, a circular series of cylinders, cooperating pistons, and counterbalanced transmission means between the pistons and the engine shaft, comprising connecting rods, a knuckle pin yoke to which the connecting rods are attached, and crank-like members which direct said yoke in an annular path, one or more of said crank-like members having driving connection with the engine shaft.

4. In a radial engine, the combination of a rotary shaft, a circular series of cylinders, cooperating pistons, and counterbalanced transmission means between the pistons and the engine shaft, comprising connecting rods, a knuckle pin yoke to which the connecting rods are attached, and crank-like members which direct said yoke in an annular path, said yoke surrounding the engine shaft, one or more of said crank-like members having driving connection with the engine shaft.

5. In a radial engine, the combination of a rotary shaft, a circular series of cylinders cooperating pistons, and transmission means between the pistons and the engine shaft, comprising connecting rods, a knuckle pin yoke to which the connecting rods are attached, and crank-like members which direct said yoke in an annular path, one of said crank-like members being extended axially to form the engine shaft.

6. In a radial engine, the combination of a rotary shaft, a circular series of cylinders, cooperating pistons, and counterbalanced transmission means between the pistons and the engine shaft, comprising connecting rods, a knuckle pin yoke to which the connecting rods are attached, and crank-like members which direct said yoke in an annular path, one of said crank-like members being extended axially to form the engine shaft.

7. In a radial engine embodying a centrally arranged rotary shaft, and a circular series of cylinders disposed radially to said shaft, in combination with transmission means between the pistons of said cylinders and the engine shaft comprising a knuckle pin yoke to which the connecting rods are attached, and crank-like members which direct said yoke in an annular path, said yoke surrounding the engine shaft, and one or more of said crank-like members having driving connection with the engine shaft.

8. In a radial engine embodying a centrally arranged rotary shaft, and a circular series of cylinders disposed radially to said shaft, in combination with counterbalanced transmission means between the pistons of said cylinders and the engine shaft comprising a knuckle pin yoke to which the connecting rods are attached, and crank-like members which direct said yoke in an annular path, said yoke surrounding the engine shaft, and one or more of said crank-like members having driving connection with the engine shaft.

In testimony whereof I affix my signature.

CHARLES I. PRESTON.